United States Patent
Lee et al.

(10) Patent No.: US 10,061,463 B2
(45) Date of Patent: Aug. 28, 2018

(54) TOUCH PANEL AND DISPLAY DEVICE INCLUDING THE SAME

(71) Applicant: SAMSUNG DISPLAY CO., LTD., Yongin-si, Gyeonggi-Do (KR)

(72) Inventors: Hee Young Lee, Suwon-si (KR); Suk Choi, Hwaseong-si (KR); Hyeon Jeong Sang, Bucheon-si (KR)

(73) Assignee: Samsung Display Co., Ltd., Yongin-si, Gyeonggi-do (KR)

( * ) Notice: Subject to any disclaimer, the term of this patent is extended or adjusted under 35 U.S.C. 154(b) by 86 days.

(21) Appl. No.: 15/049,530

(22) Filed: Feb. 22, 2016

(65) Prior Publication Data
US 2016/0259452 A1 Sep. 8, 2016

(30) Foreign Application Priority Data
Mar. 4, 2015 (KR) .................. 10-2015-0030562

(51) Int. Cl.
G06F 3/046 (2006.01)
G06F 3/047 (2006.01)
G06F 3/044 (2006.01)

(52) U.S. Cl.
CPC .............. G06F 3/047 (2013.01); G06F 3/044 (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0180910 A1* | 12/2002 | Umemoto | ............ | G02B 6/0036 349/113 |
| 2007/0172604 A1* | 7/2007 | Sugiyama | ................ | G02B 5/30 428/1.3 |
| 2009/0257003 A1* | 10/2009 | Yoshihara | .............. | G02B 1/105 349/96 |
| 2012/0003402 A1* | 1/2012 | Ohashi | ...................... | B32B 7/12 428/1.1 |
| 2013/0044215 A1 | 2/2013 | Rothkopf et al. | | |
| 2015/0166751 A1* | 6/2015 | Fukumoto | ........... | H01L 31/0481 428/447 |
| 2015/0169111 A1* | 6/2015 | Hashimoto | ............. | G06F 3/044 345/174 |
| 2015/0355489 A1* | 12/2015 | Takizawa | .................. | B32B 5/14 428/212 |
| 2016/0085100 A1* | 3/2016 | Toyoshima | ........... | H01L 27/323 349/12 |
| 2016/0085102 A1* | 3/2016 | Ohmuro | ................. | G02B 5/305 349/61 |
| 2017/0144408 A1* | 5/2017 | Sata | ......................... | B32B 5/16 |

FOREIGN PATENT DOCUMENTS

| | | |
|---|---|---|
| KR | 10-2009-0019897 A | 2/2009 |
| KR | 10-2012-0073140 A | 7/2012 |
| KR | 10-2013-0121607 A | 11/2013 |
| KR | 10-2014-0014951 A | 2/2014 |
| KR | 10-2014-0078455 A | 6/2014 |

* cited by examiner

*Primary Examiner* — Van N Chow
(74) *Attorney, Agent, or Firm* — Lee & Morse, P.C.

(57) ABSTRACT

A touch panel, including a polyurethane substrate; a touch electrode including a first electrode layer on the polyurethane substrate, the first electrode including nanowires; and a polyurethane overcoat layer on the touch electrode, the polyurethane overcoat layer having an in-plane phase difference smaller than that of the polyurethane substrate.

19 Claims, 10 Drawing Sheets

US 10,061,463 B2

TOUCH PANEL AND DISPLAY DEVICE INCLUDING THE SAME

CROSS-REFERENCE TO RELATED APPLICATION

Korean Patent Application No. 10-2015-0030562, filed on Mar. 4, 2015, in the Korean Intellectual Property Office, and entitled: "Touch Panel and Display Device Including the Same," is incorporated by reference herein in its entirety.

BACKGROUND

1. Field

The present disclosure relates to a touch panel and a display device including the same.

2. Description of the Related Art

An organic light emitting diode display is a self-luminous light emitting display device that may display an image by using an organic light emitting diode to emit light. Since the organic light emitting diode display does not require a separate light source, unlike a liquid crystal display, a thickness and weight thereof may be relatively reduced. Since the organic light emitting diode display may have high quality characteristics, such as low power consumption, high luminance, and a high reaction speed, the organic light emitting diode display may be used an a display device for a portable electronic device.

SUMMARY

Embodiments may be realized by providing a touch panel, including a polyurethane substrate; a touch electrode including a first electrode layer on the polyurethane substrate, the first electrode including nanowires; and a polyurethane overcoat layer on the touch electrode, the polyurethane overcoat layer having an in-plane phase difference smaller than that of the polyurethane substrate.

The touch electrode may further include a second electrode layer on the polyurethane overcoat layer, the second electrode layer including a transparent conductive material.

The touch panel may further include a primer layer between one or more of the polyurethane substrate and the first electrode layer or the polyurethane overcoat layer and the second electrode layer.

The primer layer may include a polyimide or a varnish material, the varnish material including an epoxy-based material, an amino-based material, an urido-based material, a mercapto-based material, or an isocyanate-based material.

The transparent conductive may include one or more of a carbon nanotube, conductive polymer, graphene, indium tin oxide (ITO), indium zinc oxide (IZO), IGZO, ZnO, ZnSnO, or SnO.

The polyurethane overcoat layer may fill a gap between the metal nanowires.

The polyurethane overcoat layer may include polyurethane formed by combining glycol and diisocyante.

The diisocyanate may include one or more of 2,4-toluene diisocyanate, 2,6-toluene diisocyanate, 4,4'-diphenylmethane diisocyanate, or polymethylene diisocyanate.

An in-plane phase difference of the polyurethane overcoat layer may be 2 nm or less for a wavelength of 550 nm.

The metal nanowires may be silver nanowires.

Embodiments may be realized by providing a touch panel, including a display panel; a touch panel including a polyurethane substrate, a touch electrode including a first electrode layer on the polyurethane substrate, and a polyurethane overcoat layer on the touch electrode, the first electrode layer including nanowires, and the polyurethane overcoat layer having an in-plane phase difference smaller than that of the polyurethane substrate; and a cover window on the touch panel.

The display panel may be an organic light emitting diode display or a liquid crystal display.

The touch electrode further may include a second electrode layer on the polyurethane overcoat layer, the second electrode including a transparent conductive material.

The touch panel may further including a primer layer between one or more of the polyurethane substrate and the first electrode layer or the polyurethane overcoat layer and the second electrode layer.

The primer layer may include a polyimide or a varnish material, the varnish material including an epoxy-based material, an amino-based material, an urido-based material, a mercapto-based material, or an isocyanate-based material.

The transparent conductive material may include one or more of a carbon nanotube, conductive polymer, graphene, indium tin oxide (ITO), indium zinc oxide (IZO), IGZO, ZnO, ZnSnO, or SnO.

The polyurethane overcoat layer may fill a gap between the metal nanowires.

The polyurethane overcoat layer may include polyurethane formed by combining glycol and diisocyante.

The diisocyanate may include one or more of 2,4-toluene diisocyanate, 2,6-toluene diisocyanate, 4,4'-diphenylmethane diisocyanate, or polymethylene diisocyanate.

An in-plane phase difference of the polyurethane overcoat layer may be 2 nm or less for a wavelength of 550 nm.

The metal nanowires may be silver nanowires.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
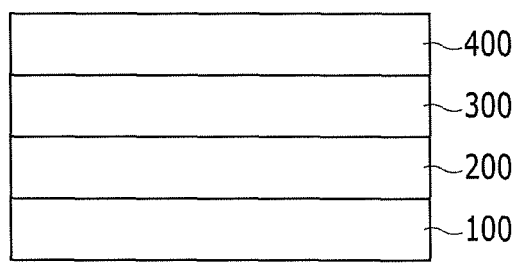
FIG. 1 illustrates a schematic cross-sectional view of a touch panel according to an exemplary embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

To clearly describe the present disclosure, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present disclosure is not limited to the illustrated sizes and thicknesses.

In the drawings, the thicknesses of layers, films, panels, regions, etc., may be exaggerated for clarity. In the drawings, for better understanding and ease of description, the thicknesses of some layers and areas are exaggerated. It will be understood that when an element such as a layer, film, region, or substrate is referred to as being "on" another element, it can be directly on the other element or intervening elements may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

In addition, unless explicitly described to the contrary, the word "comprise" and variations such as "comprises" or "comprising", will be understood to imply the inclusion of stated elements, but not the exclusion of any other elements. Further, in the specification, the word "on" means positioned on or below the object portion, but does not essentially mean positioned on the upper side of the object portion based on a gravitational direction.

Further, in the specification, the phrase "in a plan view" means when an object portion is viewed from above, and the phrase "in a cross-section" means when a cross-section taken by vertically cutting an object portion is viewed from the side.

Hereinafter, a touch panel according to an exemplary embodiment of the present disclosure will be described with reference to the drawings.

FIG. 1 illustrates a schematic cross-sectional view of a touch panel according to an exemplary embodiment of the present disclosure.

As shown in FIG. 1, the touch panel 1000 according to an exemplary embodiment of the present disclosure may include a substrate 100, a first electrode layer 200 formed on the substrate 100, an overcoat layer 300 formed on the first electrode layer 200, and a second electrode layer 400 formed on the overcoat layer 300.

The substrate 100 may be formed of polyurethane having stretchable and elastic characteristics. The substrate 100 may be formed by coating the polyurethane using a method such as slit coating or spray and curing it. The polyurethane may be formed to have a thickness of 5 μm or less.

The first electrode layer 200 may include a metal wire (nanowire) made of, for example, silver (Ag) or copper (Cu). The metal nanowires may be connected to each other in a mesh shape to serve as a conductive electrode.

The overcoat layer 300 may protect and secure the metal nanowire.

The overcoat layer 300 may be mixed with the metal nanowire to be coated, or may be coated on a formed metal nanowire layer. The overcoat layer 300 may be formed by using, for example, a solution process, identically to the substrate 100. The overcoat layer 300 may fill a space, e.g., gap, between the metal nanowires and may improve adhesion between the metal nanowire and the substrate 100. The overcoat layer 300 may be formed to have a thickness of 900 Å.

The overcoat layer 300 may be made of polyurethane that may be formed by combining glycol and diisocyanate. The diisocyanate may include one or more of 2,4-toluene diisocyanate, 2,6-toluene diisocyanate, 4,4'-diphenylmethane diisocyanate, or polymethylene diisocyanate.

An in-plane phase difference $R_e$ of the overcoat layer 300 may be smaller than that of the substrate 100. The in-plane phase difference $R_e$ of the substrate 100 for a wavelength of 550 nm may be 3 nm or less. The in-plane phase difference $R_e$ of the overcoat layer 300 for a wavelength of 550 nm may be 2 nm or less to prevent from changing of color coordinator and occurring rainbow moire. For replacing a phase difference film into the substrate 100, the in-plane phase difference $R_e$ of the substrate 100 may be from 135 nm to 150 nm.

The first electrode layer 200 may have a high transmittance and a sheet resistance characteristic that is lower than a predetermined level, and a high conductivity may be accomplished. The first electrode layer 200 may be more flexible than other metal thin films.

The second electrode layer 400 may serve as a layer to supplement conductivity of the first electrode layer 200, may have a transmittance that is higher than a predetermined level, and may include a transparent conductive material on which dry etching may be performed. An example of the transparent conductive material may include one or more of a carbon nanotube, a conductive polymer such as poly(3,4-ethylenedioxythiophene)polystyrene sulfonate is (PEDOT: PSS), graphene, indium tin oxide (ITO), indium zinc oxide (IZO), IGZO, ZnO, ZnSnO, or SnO, and the transparent conductive material may have a transmittance of substantially 85% or more for a visible ray region.

Figure 2:
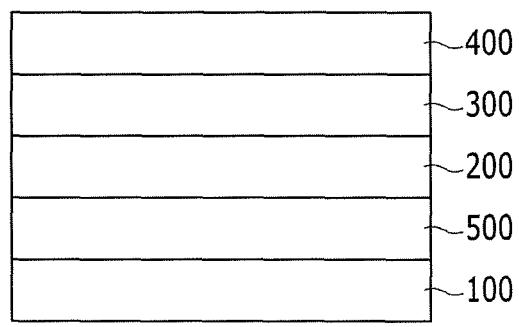
FIG. 2 and FIG. 3 illustrate schematic cross-sectional views of touch panels according to exemplary embodiments.
Figure 3:
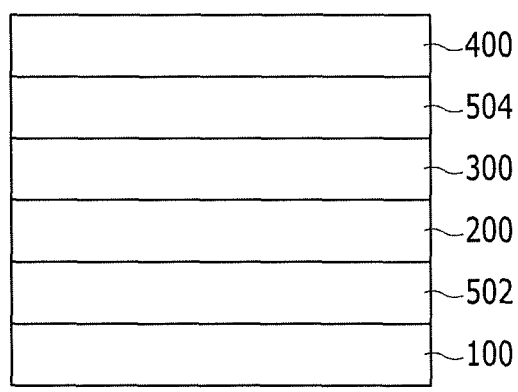

FIG. 2 and FIG. 3 illustrate schematic cross-sectional views of touch panels according to exemplary embodiments.

A touch panel 1002 illustrated in FIG. 2 may be practically the same as the touch panel 1000 illustrated in FIG. 1, and only the different parts will be described in detail.

As shown in FIG. 2, the touch panel 1002 according to an exemplary embodiment of the present disclosure may include a substrate 100, a first electrode layer 200 formed on the substrate 100, an overcoat layer 300 formed on the first electrode layer 200, and a second electrode layer 400 formed on the overcoat layer 300. The touch panel 1002 may further include a primer layer 500 formed between the substrate 100 and the first electrode layer 200, e.g., formed in a gap between the substrate 100 and the first electrode layer 200.

The primer layer 500 may serve to further improve a close contacting property between the substrate 100 made of polyurethane and an upper layer thereof, and may be made of a polyimide or a varnish type material including an epoxy-based material, an amino-based material, an urido-based material, a mercapto-based material, or an isocyanate-based material.

A touch panel 1004 illustrated in FIG. 3 may be mostly the same as the touch panel 1002 illustrated in FIG. 3, and different parts will be described in detail.

As shown in FIG. 3, the touch panel 1004 according to an exemplary embodiment of the present disclosure may include a substrate 100, a first primer layer 502 formed on the substrate 100, a first electrode layer 200 formed on the first primer layer 502, an overcoat layer 300 formed on the first electrode layer 200, and a second electrode layer 400 formed on the overcoat layer 300. The touch panel 1004 may further include a second primer layer 504 formed between the overcoat layer 300 and the second electrode layer 400, e.g., formed in a gap between the overcoat layer 300 and the second electrode layer 400.

The first primer layer 502 and the second primer layer 504 may respectively serve to improve a close contacting property with upper layers thereof, and may be made of the same material, which may include a polyimide or a varnish type material including an epoxy-based material, an amino-based material, an urido-based material, a mercapto-based material, or an isocyanate-based material.

Hereinafter, a display device including the aforementioned touch panel will be described with reference to FIG. 4 and FIG. 5.

Figure 4:
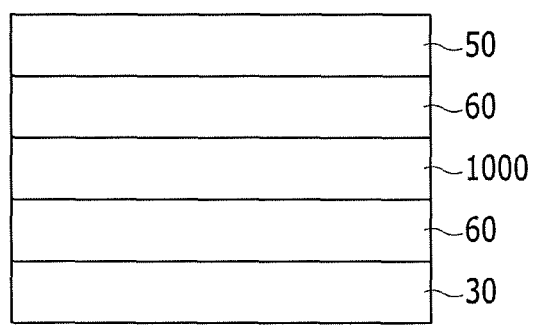
FIG. 4 illustrates a schematic cross-sectional view of a display device according to an exemplary embodiment of the present disclosure.
Figure 5:
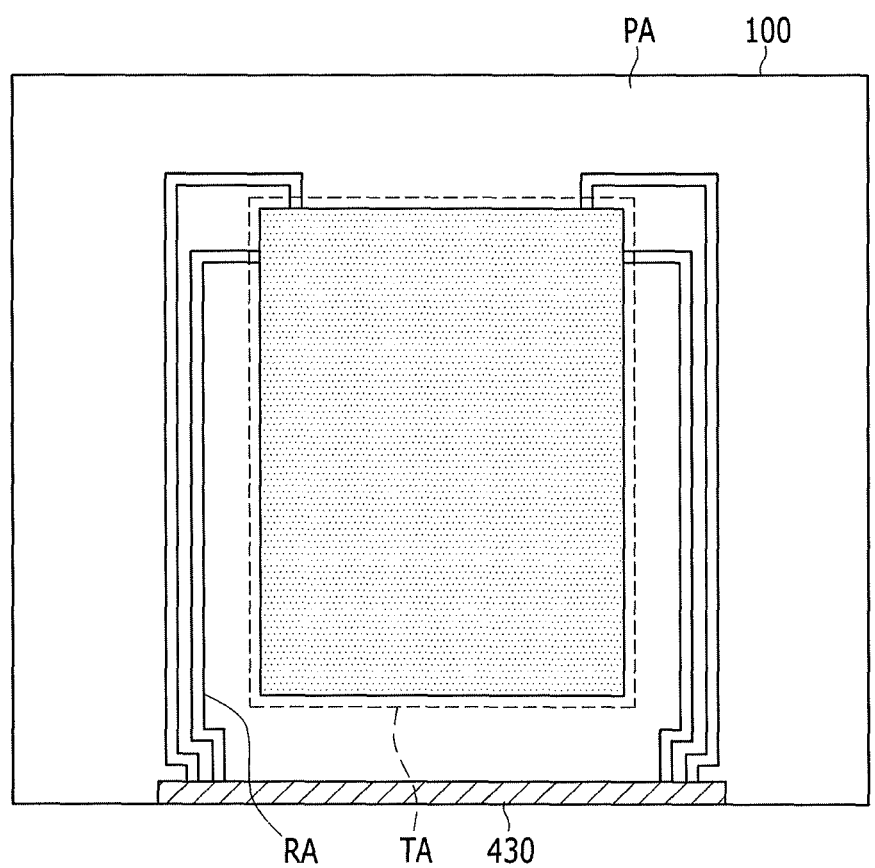
FIG. 5 illustrates a schematic layout view of a touch panel included in the display device illustrated in FIG. 4.

FIG. 4 illustrates a schematic cross-sectional view of a display device according to an exemplary embodiment of the present disclosure, and FIG. 5 illustrates a schematic layout view of a touch panel included in the display device illustrated in FIG. 4.

As shown in FIG. 4, the display device 1 according to the exemplary embodiment of the present disclosure may include a touch panel 1000 and a display panel 30.

The display panel 30 may include a plurality of signal lines formed on a substrate and a plurality of pixels connected thereto, to display images. The substrate of the display panel 30 may be a transparent flexible substrate having a flexible characteristic, e.g., being foldable (bendable), rollable, and stretchable or elastic in at least one direction.

The pixels may be disposed in a display area for displaying the images. The pixels may include at least one switching element connected to a signal line and at least one pixel electrode connected thereto. The switching element may include at least one thin film transistor, and may be controlled by a gate signal to transmit a data voltage to the pixel electrode. Each pixel may display the image with desired luminance according to the data voltage applied to the pixel electrode.

For example, the display panel 30 may be a liquid crystal panel or an organic light emitting diode display panel. The liquid crystal panel may further include a backlight unit for supplying light to the display panel 30.

The touch panel 1000 may be the touch panel illustrated in FIG. 1, and may include a substrate, a first electrode layer, an overcoat layer, and a second electrode layer. The touch panel may be attached to the display panel 30 through an adhesive 60, which may include an optical clear adhesive (OCA), an optical clear resin (OCR), or a pressure sensitivity adhesive (PSA).

The touch panel 1000 may include a touch sensor, which may sense a touch position corresponding to a contact or an approach of an external object. The touch sensor may include a touch electrode, which may be formed to include the first electrode layer and the second electrode layer illustrated in FIG. 1.

The touch area, in which the touch area may be formed, may correspond to a display area at which pixels may be formed in a display panel.

The touch sensor may be various types of touch sensors, and may be a capacitive type of touch sensor, for example.

In the case of the capacitive type of touch sensor, a touch electrode of the touch sensor may receive a sensing input signal from a driver, and may generate a sensing output signal that varies according to contacts and output it to the driver.

When the touch electrode constitutes a self-sensing capacitor together with an external object, the touch electrode may receive a sensing input signal to be charged with a predetermined amount of charge, and when contact is made by an external object such as a finger, the amount of charge stored in the self-sensing capacitor may be changed and a sensing output signal that may be different from the input sensing input signal may be outputted. Contact information such as whether the contact exists and a contact position may be determined through the changed sensing output signal.

When neighboring touch electrodes constitute a mutual-sensing capacitor, one touch electrode may receive a sensing input signal from the driver and the self-sensing capacitor may be charged with a predetermined amount of charge. When contact is made by an external object such as a finger, the stored amount of charge of the self-sensing capacitor may be changed and the changed amount of charge may be outputted as a sensing output signal. The contact information such as a contact state or a contact position may be recognized by the sensing output signal.

A plurality of touch electrodes may be disposed on a same layer or different layers. The touch electrodes disposed on different layers may be positioned on different sides of a substrate or on different layers on a same side of the substrate Referring to FIG. 5, a plurality of touch electrodes may be connected to the sensing signal controller 430 through a plurality of signal wires RL. The sensing signal controller 430 may be formed on the substrate 100. The signal wires RL may be used to input an input signal into a touch electrode, or to output an output signal to the driver through the sensing signal controller 430. The sensing signal controller 430 may be connected to the driver in a form of a driving circuit chip, a circuit board, or a circuit film, and may be disposed in a peripheral area PA of the touch area TA. The sensing signal controller 430 may be disposed on one side of the peripheral area PA, for example, a lower side of the touch area PA illustrated in FIG. 5.

The signal wires RL may or may not be disposed at a same layer as the touch electrode. When the signal wires RL are disposed on the same layer as the touch electrode, the signal wires may be made of a same material as the touch electrode through a same process, or may be made of a different material.

In an embodiment, the signal wires RL may be disposed in the peripheral area PA. In an embodiment, the signal wires RL may be disposed in the touch area TA.

Hereinafter, a touch sensor according to an exemplary embodiment of the present disclosure will be described in detail with reference to FIG. 6 and FIG. 7.

Figure 6:
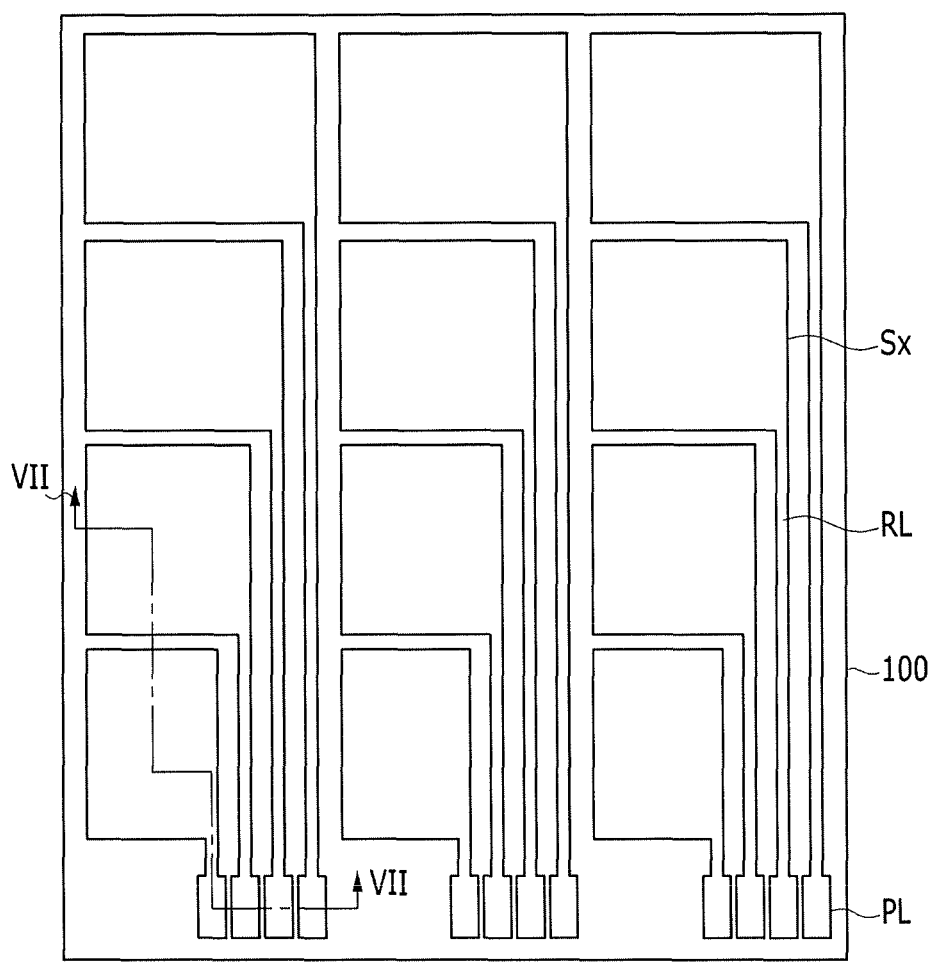
FIG. 6 illustrates a layout view of a touch sensor included in the touch panel illustrated in FIG. 5.
Figure 7:
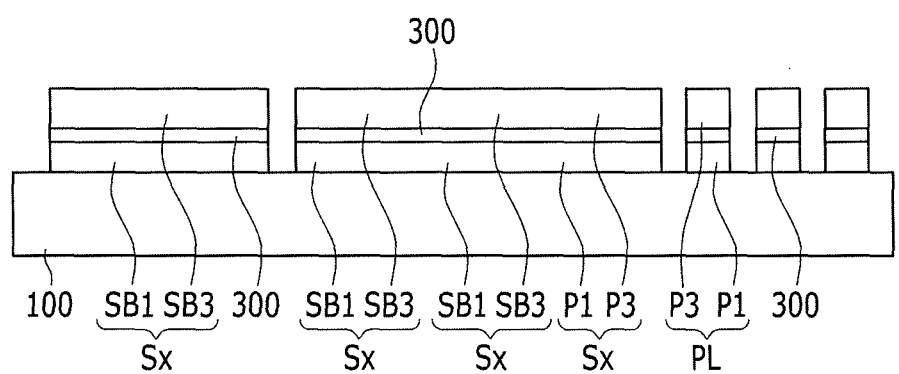
FIG. 7 illustrates a cross-sectional view taken along a line VII-VII of FIG. 6.

FIG. 6 illustrates a layout of the touch sensor according to the exemplary embodiment of the present disclosure, and FIG. 7 illustrates a cross-sectional view taken along a line VII-VII of FIG. 6.

As shown in FIG. 6 and FIG. 7, the touch sensor according to the exemplary embodiment of the present disclosure may be formed on a substrate 100, and may include pads PL and signal wires RL for connecting touch electrodes Sx and a signal controller.

As shown in FIG. 1, the substrate 100 may be a substrate made of polyurethane.

The touch sensor may include the touch electrodes Sx disposed in an active area of the substrate 100 and the signal lines RL connected to the touch electrodes Sx. The active area may serve as an area in which a touch may be applied and sensed, and for example, in the case of a display panel, the active area may be positioned to overlap a display area in which an image may be displayed.

In the case of a touch panel, the active area may be a touch area, and when the touch panel is mounted in the display panel, the touch area may be positioned to overlap the display area. Hereinafter, the active area may also be referred to as a touch area.

The touch electrodes Sx may be arranged in a matrix form, and may be formed on a same layer as when viewed from a cross-sectional structure. The touch electrodes Sx may include a lower electrode SB1 made of a metal nanowire that may be the same material as that of the first electrode layer of FIG. 1, and an upper electrode SB3, which may be made of a same material as that of the second electrode layer, for example, a transparent conductive material including one or more of a carbon nanotube, a conductive polymer such as PEDOT:PSS, graphene, ITO, IZO, IGZO, ZnO, ZnSnO, or SnO. An overcoat layer 300 may be disposed between the lower electrode SB1 and the upper electrode SB3.

An in-plane phase difference of the overcoat layer 300 may be 2 nm or less, and may be smaller than that of the substrate 100.

In an embodiment, the touch electrodes Sx may have a quadrangular shape. In an embodiment, the touch electrodes Sx may have various other shapes. The touch electrodes Sx may have a plurality of protrusions and depressions, which may be formed at edge sides, to improve a touch sensitivity. When the protrusions and depressions are formed at the edge sides of the touch electrodes Sx, the protruding and depressed edge sides of adjacent touch electrodes Sx may be engaged with each other.

The touch electrodes Sx may be separately disposed in the touch area, and different touch electrodes Sx may be respectively connected to the sensing signal controller through different signal wires RL.

According to the present exemplary embodiment, the touch electrodes Sx may receive sensing input signals from the sensing signal controller through the pads PL and the signal wires RL, and may generate sensing output signals depending on contacts to transmit them to the sensing signal controller. Each of the touch electrodes Sx may constitute a self-sensing capacitor and receive a sensing input signal to be charged with a predetermined amount of charge. Then, when contact is made by an external object such as a finger, the amount of charge stored in the self-sensing capacitor may be changed and a sensing output signal that may be different from the input sensing input signal may be outputted. Contact information such as a contact state or a contact position may be recognized by the sensing output signal.

The signal wires RL may connect the touch electrodes Sx and the pads PL so as to transmit sensing input signals or sensing output signals. The signal wires RL may include a first signal wire R1 made of a metal nanowire that may be the same material as that of the first electrode layer of FIG. 1, and a second signal wire R3, which may be made of a same material as that of the second electrode layer, for example, a transparent conductive material including one or more of a carbon nanotube, a conductive polymer such as PEDOT:PSS, graphene, ITO, IZO, IGZO, ZnO, ZnSnO, or SnO. An overcoat layer 300 may be disposed between the first signal wire R1 and the second signal wire R3.

The pads PL may have the same stacked structure as that of the signal wires RL, and may include a first signal wire R1 made of a metal nanowire that may be the same material as that of the first electrode layer of FIG. 1, and a second pad P3, which may be made of a same material as that of the second electrode layer, for example, a transparent conductive material including one or more of a carbon nanotube, a conductive polymer such as PEDOT:PSS, graphene, ITO, IZO, IGZO, ZnO, ZnSnO, or SnO. An overcoat layer 300 may be disposed between the first pad P1 and the second pad P2, and a pad made of copper or silver paste may be further disposed on the second pad P3 to facilitate contact with external driver.

In the exemplary embodiment of FIG. 6, the number of the signal wires RL may be increased toward the pads PL, and the size of the touch electrodes Sx may be reduced toward the pads PL.

In an embodiment, the touch electrodes Sx may have a quadrangular shape. In an embodiment, the touch electrodes Sx may have various other shapes. The touch electrodes Sx may have a plurality of protrusions and depressions, which may be formed at edge sides, to improve touch sensitivity. When the protrusions and depressions are formed at the edge sides of the touch electrodes Sx, the protruding and depressed edge sides of adjacent touch electrodes Sx may be engaged with each other.

According to the present exemplary embodiment, the touch electrodes Sx may receive sensing input signals from the sensing signal controller through the signal wires RL, and may generate sensing output signals depending on contacts to transmit them to the sensing signal controller. Each of the touch electrodes Sx may constitute a self-sensing capacitor and receive a sensing input signal to be charged with a predetermined amount of charge. Then, when contact is made by an external object such as a finger, the amount of charge stored in the self-sensing capacitor may be changed and a sensing output signal that may be different from the input sensing input signal may be outputted. Contact information such as a contact state or a contact position may be recognized by the sensing output signal.

The signal wires RL may connect the touch electrodes Sx and the sensing signal controller so as to transmit sensing input signals or sensing output signals. In an embodiment, the signal wires RL may be disposed on the same layer as that of the touch electrodes Sx, and may be made of the same material as the touch electrodes Sx. In an embodiment, the signal wires RL may be disposed at a layer that is different from that of the touch electrodes Sx, and may be connected to the touch electrodes Sx through additional connectors.

Figure 8:
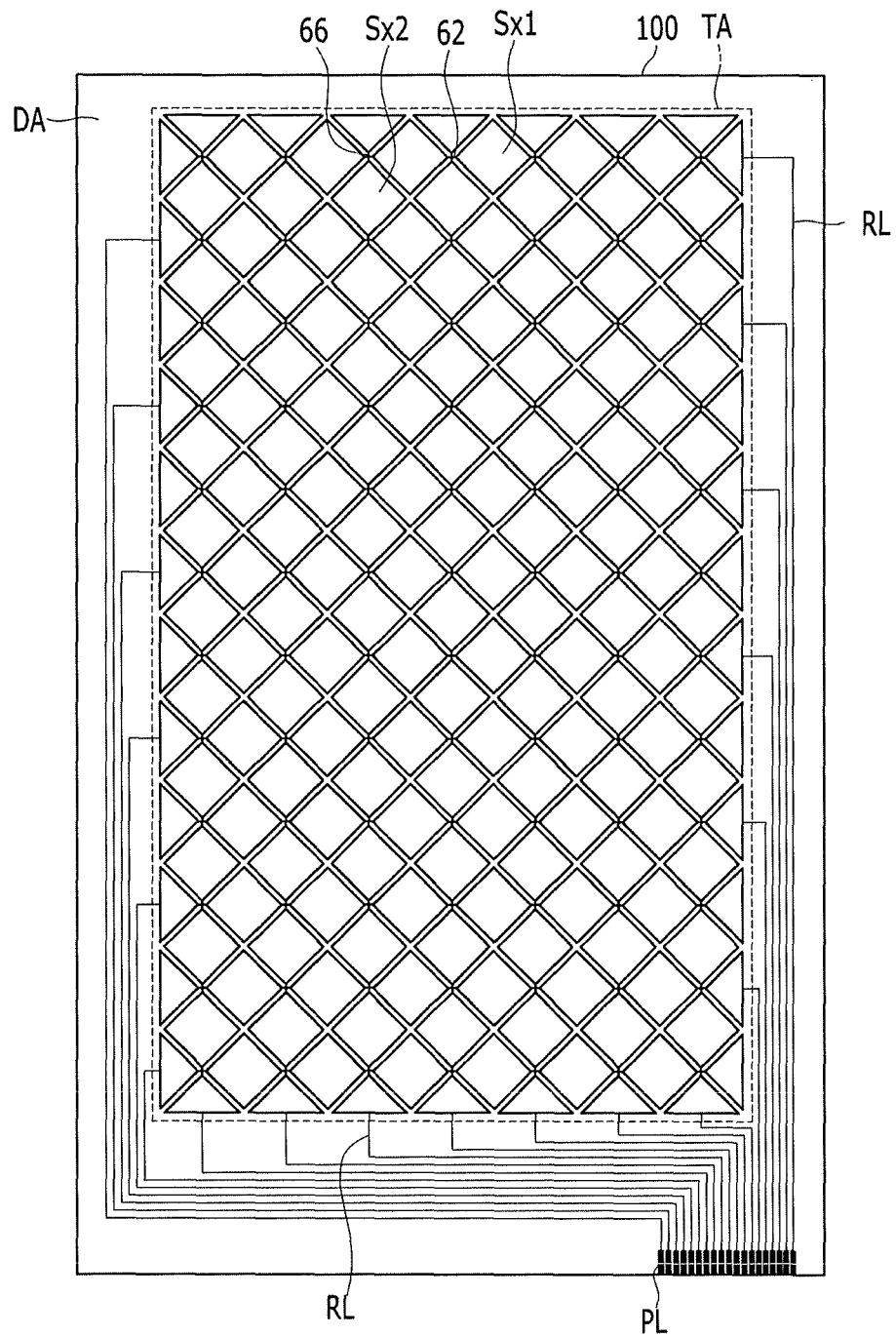
FIG. 8 illustrates a schematic layout view of a touch panel according to an exemplary embodiment of the present disclosure.
Figure 9:
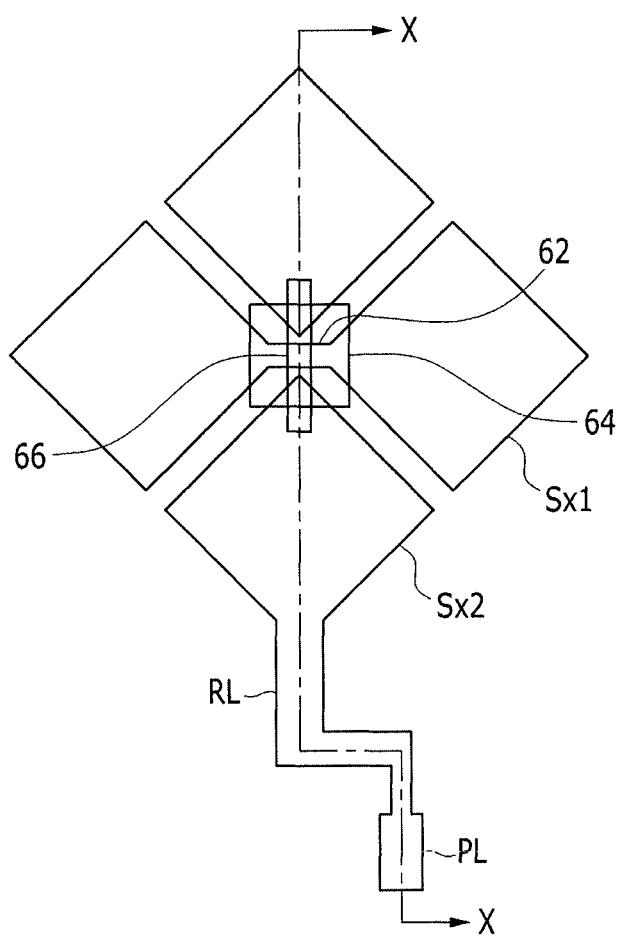
FIG. 9 illustrates an enlarged view of a part of FIG. 8.
Figure 10:
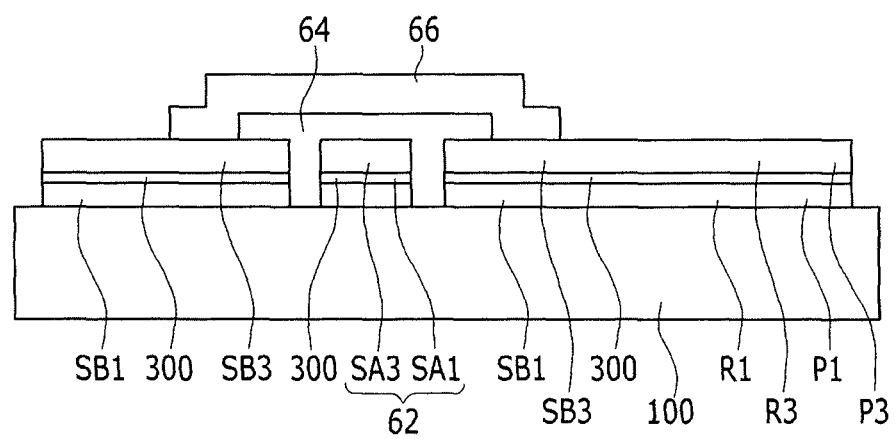
FIG. 10 illustrates a cross-sectional view taken along a line X-X of FIG. 9.

FIG. 8 illustrates a schematic layout view of a touch panel according to an exemplary embodiment of the present disclosure, FIG. 9 illustrates an enlarged view of a part of FIG. 8, and FIG. 10 illustrates a cross-sectional view taken along a line X-X of FIG. 9.

Referring to FIG. 8 to FIG. 10, the touch panel according to the exemplary embodiment of the present disclosure may include a plurality of first touch electrodes Sx1 and a plurality of second touch electrodes Sx2 formed on a touch substrate 100. Each of the first touch electrode Sx1 and the second touch electrode Sx2 may include a lower electrode SB1 made of a metal nanowire that may be the same material as that of the first electrode layer of FIG. 1, and an upper electrode SB3, which may be made of a same material as that of the second electrode layer, for example, a transparent conductive material including one or more of a carbon nanotube, a conductive polymer such as PEDOT:PSS, graphene, ITO, IZO, IGZO, ZnO, ZnSnO, or SnO. An overcoat layer 300 may be disposed between the lower electrode SB1 and the upper electrode SB3. The substrate 100 may be a polyurethane substrate illustrated in FIG. 1.

The first touch electrode Sx1 and the second touch electrode Sx2 may be disposed in a matrix form in a touch area TA. In an embodiment, each of the first touch electrode Sx1 and the second touch electrode Sx2 may have a quadrangular shape. In an embodiment, each of the first touch electrode Sx1 and the second touch electrode Sx2 may have various other shapes, such as a shape formed with a protrusion, to improve sensitivity of the touch sensor.

The first touch electrodes Sx1 may be arranged in the same row or column and may be connected to each other or separated from each other inside or outside the touch area TA. Similarly, the second touch electrodes Sx2 may be arranged in the same row or column and may be connected to each other or separated from each other inside or outside the touch area TA.

For example, as shown in FIG. 8, when the first touch electrodes Sx1 disposed in the same row are connected to each other inside the touch area TA, the second touch electrodes Sx2 disposed in the same column may be connected to each other inside the touch area TA For example, the first touch electrodes Sx1 disposed in each row may be connected to each other through a first connector 62, and the second touch electrodes Sx2 disposed in each column may be connected to each other through a second connector 66

Referring to FIG. 9 and FIG. 10, the first connector 62 serving to connect adjacent first touch electrodes Sx1 may be integrally formed, and may be simultaneously patterned to include a lower layer SA1 and an upper layer SA3.

The second connector 66 serving to connect adjacent second touch electrodes Sx2 may be disposed at a layer different from that of the second touch electrodes Sx2. The second touch electrodes Sx2 and the second connectors 66 may be individually formed, and may be connected with each other through direct contact. The second connectors 66 may be made of a low resistance material such as copper.

An insulating layer 64 may be formed between the first connector 62 and the second connector 66 to insulate them from each other. The insulating layers 64, as shown in FIG. 9 and FIG. 10, may be a plurality of independent island-shaped insulators disposed at every crossing point of the first connectors 62 and the second connectors 66. The insulating layers 64 may be disposed to expose at least one part of the second touch electrodes Sx2, such that the second connectors 66 may respectively be connected to the second touch electrodes Sx2.

The signal wires RL may have the same stacked structure as the touch electrodes, and may include a first signal wire R1 formed of a metal nanowire and a second signal wire R3 formed of a transparent conductive material.

An overcoat layer 300 may be interposed between the first signal wire R1 and the second signal wire R3, may be made of the same material as that of the overcoat layer of FIG. 1, and may have a phase difference that is smaller than the in-plane phase difference of the substrate 100.

The first touch electrode Sx1 and the second touch electrode Sx2, which may be adjacently disposed, may constitute a mutual sensing capacitor serving as a touch sensor. The mutual sensing capacitor may receive a sensing input signal through one of the first touch electrode Sx1 and the second touch electrode Sx2, and may output a sensing output signal indicating a variation of the charge amount caused by the contact of the external object to the other touch electrode.

Referring to FIG. 4 again, the display device 1 may further include a cover window 50 which is disposed on the touch substrate 100.

The cover window 50 may be made of an insulating material such as plastic, in order to be flexible. A surface of the cover window 50 may be a touch surface of the display device 1, which may be contactable by an external object.

A light blocking member may be disposed at an edge of a lower surface of the cover window 50. The light blocking member may be disposed to cover the display device 1 while exposing a display area or a touch area of the display panel 30 and allowing a peripheral area to be invisible.

The cover window 50 may be attached to the touch substrate through an adhesive, the touch substrate 100 may further include a passivation layer, and the cover window 50 may be attached after the adhesive is coated on the passivation layer. In an embodiment, the cover window 50 may be attached after the adhesive is coated on the touch electrode of the touch substrate 100 without using the passivation layer.

By way of summation and review, an organic light emitting diode display may be a flexible display device and a stretchable display device by using a substrate made of a flexible or stretchable material such as plastic or foil, which may easily be made into a large-area, thin, and lightweight display.

A touch sensor may be mounted in such a display device, or a touch panel including a touch sensor may be attached thereto, and the thickness of the display device may be increased. Accordingly, the display device may be susceptible to bending and stretching.

To implement a display device, however, a thin film, for example, formed on a substrate, as well as the substrate itself, should not be susceptible to bending and stretching.

A plurality of thin films included in the display device, for example, electrodes, may be susceptible to bending and stretching, and may be easily breakable.

According to the exemplary embodiments of the present disclosure, it may be possible to provide a touch panel and a display device including the same, that may be capable of preventing a plurality of thin films, for example, electrodes, from being easily broken, for example, due to stresses caused by bending and stretching.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A touch panel, comprising:
    an elastic polyurethane substrate;
    a first electrode layer on the polyurethane substrate, the first electrode layer including nanowires; and
    a polyurethane overcoat layer on the first electrode layer, the polyurethane overcoat layer filling a space between the nanowires and having an in-plane phase difference smaller than that of the polyurethane substrate, the in-plane phase difference of the polyurethane overcoat layer being 2 nm or less.

2. The touch panel as claimed in claim 1, further comprising a second electrode layer on the polyurethane overcoat layer, the second electrode layer including a transparent conductive material.

3. The touch panel as claimed in claim 2, further comprising a primer layer between one or more of the polyurethane substrate and the first electrode layer or the polyurethane overcoat layer and the second electrode layer.

4. The touch panel as claimed in claim 3, wherein the primer layer includes a polyimide or a varnish material, the varnish material including an epoxy-based material, an amino-based material, an urido-based material, a mercapto-based material, or an isocyanate-based material.

5. The touch panel as claimed in claim 2, wherein the transparent conductive material includes one or more of a carbon nanotube, conductive polymer, graphene, indium tin oxide (ITO), indium zinc oxide (IZO), IGZO, ZnO, ZnSnO, or SnO.

6. The touch panel as claimed in claim 1, wherein the polyurethane overcoat layer includes polyurethane formed by combining glycol and diisocyanate.

7. The touch panel as claimed in claim 6, wherein the diisocyanate includes one or more of 2,4-toluene diisocyanate, 2,6-toluene diisocyanate, 4,4'-diphenylmethane diisocyanate, or polymethylene diisocyanate.

8. The touch panel as claimed in claim 1, wherein an in-plane phase difference of the polyurethane overcoat layer is 2 nm or less for a wavelength of 550 nm.

9. The touch panel as claimed in claim 1, wherein the metal nanowires are silver nanowires.

10. A touch panel, comprising:
a flexible display panel;
a touch panel including an elastic polyurethane substrate, a first electrode layer on the polyurethane substrate, and a polyurethane overcoat layer on the first electrode layer, the first electrode layer including nanowires, and the polyurethane overcoat layer filling a space between the nanowires and having an in-plane phase difference smaller than that of the polyurethane substrate, the in-plane phase difference of the polyurethane overcoat layer being 2 nm or less; and
a cover window on the touch panel.

11. The touch panel as claimed in claim 10, wherein the display panel is an organic light emitting diode display or a liquid crystal display.

12. The touch panel as claimed in claim 10, further comprising a second electrode layer on the polyurethane overcoat layer, the second electrode layer including a transparent conductive material.

13. The touch panel as claimed in claim 12, further comprising a primer layer between one or more of the polyurethane substrate and the first electrode layer or the polyurethane overcoat layer and the second electrode layer.

14. The touch panel as claimed in claim 13, wherein the primer layer includes a polyimide or a varnish material, the varnish material including an epoxy-based material, an amino-based material, an urido-based material, a mercapto-based material, or an isocyanate-based material.

15. The touch panel as claimed in claim 12, wherein the transparent conductive material includes one or more of a carbon nanotube, conductive polymer, graphene, indium tin oxide (ITO), indium zinc oxide (IZO), IGZO, ZnO, ZnSnO, or SnO.

16. The touch panel as claimed in claim 10, wherein the polyurethane overcoat layer includes polyurethane formed by combining glycol and diisocyanate.

17. The touch panel as claimed in claim 16, wherein the diisocyanate includes one or more of 2,4-toluene diisocyanate, 2,6-toluene diisocyanate, 4,4'-diphenylmethane diisocyanate, or polymethylene diisocyanate.

18. The touch panel as claimed in claim 10, wherein an in-plane phase difference of the polyurethane overcoat layer is 2 nm or less for a wavelength of 550 nm.

19. The touch panel as claimed in claim 10, wherein the metal nanowires are silver nanowires.

* * * * *